(12) United States Patent
Kurigata

(10) Patent No.: US 9,477,911 B2
(45) Date of Patent: Oct. 25, 2016

(54) IMAGE FORMING APPARATUS HAVING AN ASSIGNMENT UNIT THAT ASSIGNS PULSE MODULATION SIGNALS IN ACCORDANCE WITH A PREDETERMINED RULE AND A SPECIFIC PIXEL POSITION INFORMATION

(71) Applicant: KONICA MINOLTA, INC., Chiyoda-ku, Tokyo (JP)

(72) Inventor: Yuhei Kurigata, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/950,883

(22) Filed: Nov. 24, 2015

(65) Prior Publication Data

US 2016/0180202 A1 Jun. 23, 2016

(30) Foreign Application Priority Data

Dec. 22, 2014 (JP) .................................. 2014-258260

(51) Int. Cl.
| | | |
|---|---|---|
| G06F 15/00 | (2006.01) | |
| G06K 15/12 | (2006.01) | |
| H04N 1/04 | (2006.01) | |
| H04N 1/191 | (2006.01) | |
| G03G 15/04 | (2006.01) | |
| G06T 5/00 | (2006.01) | |

(52) U.S. Cl.
CPC ..... G06K 15/1219 (2013.01); G03G 15/04036 (2013.01); G06K 15/1261 (2013.01); H04N 1/0414 (2013.01); H04N 1/1913 (2013.01)

(58) Field of Classification Search
CPC .......... G06K 15/029; G06K 15/1219; G06K 15/04036; G06K 15/1261; G06F 3/1219; G06F 3/1234; H04N 1/0414; H04N 1/1913; H04N 1/4056; H04N 1/4092; H04N 1/58; B41J 2/471; G03G 15/011; G03G 15/04072; G03G 15/326

USPC ............... 358/1.1, 1.2, 1.8, 3.15, 3.26, 3.27; 347/131, 224, 249; 382/269; 399/27, 399/177

See application file for complete search history.

(56) References Cited

U.S. PATENT DOCUMENTS 7,920,155 B2 * 4/2011 Miyake .................... B41J 2/471
347/234

(Continued)

FOREIGN PATENT DOCUMENTS

| JP | 2007-109929 A | 4/2007 |
|---|---|---|
| JP | 2009-034991 A | 2/2009 |

*Primary Examiner* — Gabriel Garcia

(74) *Attorney, Agent, or Firm* — Buchanan Ingersoll & Rooney PC

(57) ABSTRACT

Disclosed is an image forming apparatus, including: n laser elements arranged in the sub-scanning direction and configured to simultaneously scan an image; a pixel selection unit configured to execute a thinning process in which the pixels are thinned by selecting m pixels among n pixels arranged in the sub-scanning direction, by changing positions of the pixels to be selected according to positions in the main scanning direction; a pulse width modulation processing unit configured to sequentially convert image data corresponding to the m pixels into m pulse width modulation signals; a transmission unit configured to transmit the m pulse width modulation signals in parallel; an assignment unit configured to assign the m pulse width modulation signals to m laser elements corresponding to the positions of the m pixels; and a driving unit configured to drive the laser elements in accordance with the assigned pulse width modulation signals.

7 Claims, 18 Drawing Sheets

(56) References Cited

U.S. PATENT DOCUMENTS 8,237,760 B2 * 8/2012 Nihei ................. G06K 15/1219
                                                             347/237

8,482,591 B2 * 7/2013 Yoshida ........... G03G 15/04072
                                                             347/254

8,873,101 B2 * 10/2014 Tamura ................ G03G 15/043
                                                             358/1.16

* cited by examiner

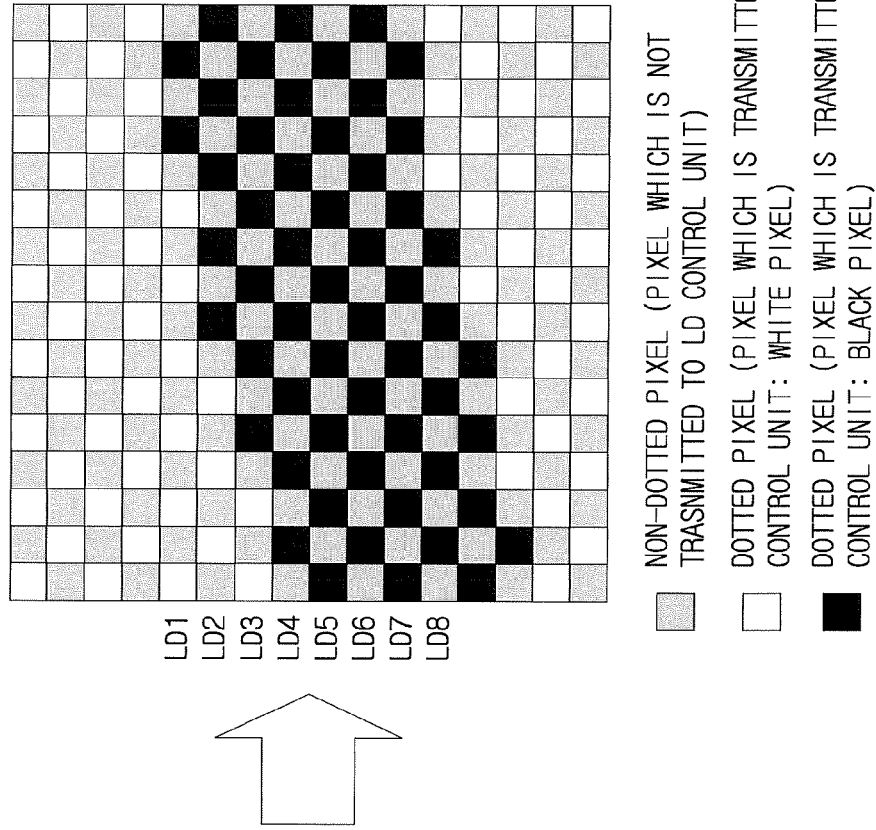
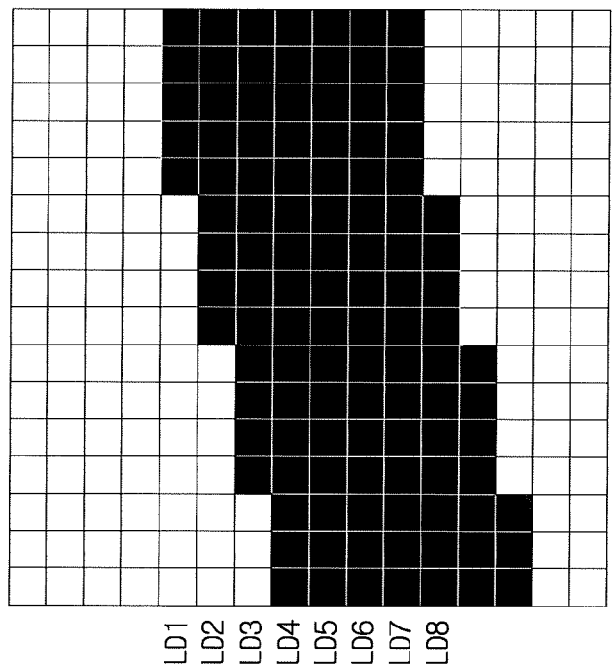
FIG. 3A
FIG. 3B

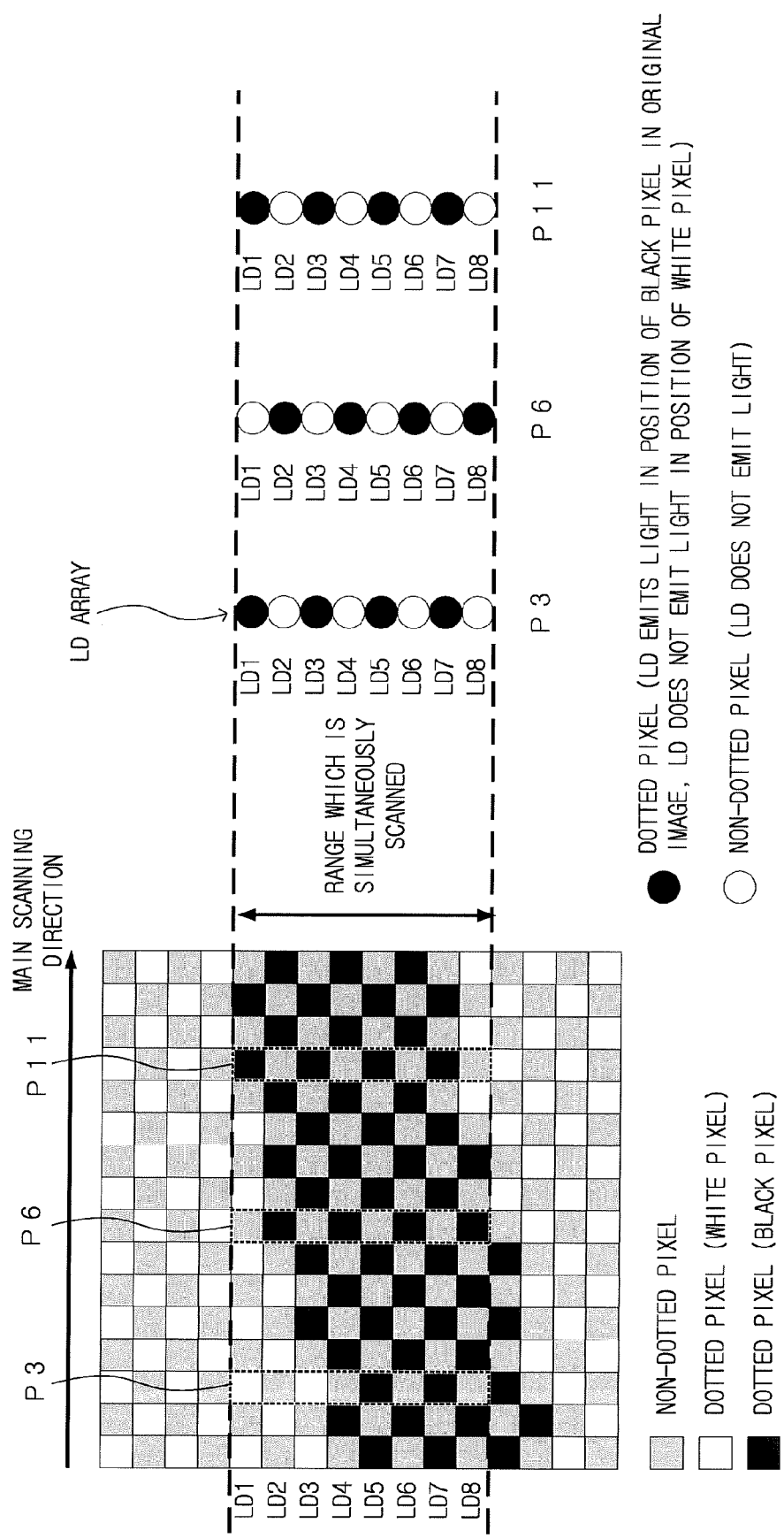

RESOLTION IN SUB-SCANNING DIRECTION: 1200 dpi

RESOLTION IN SUB-SCANNING DIRECTION: 2400 dpi

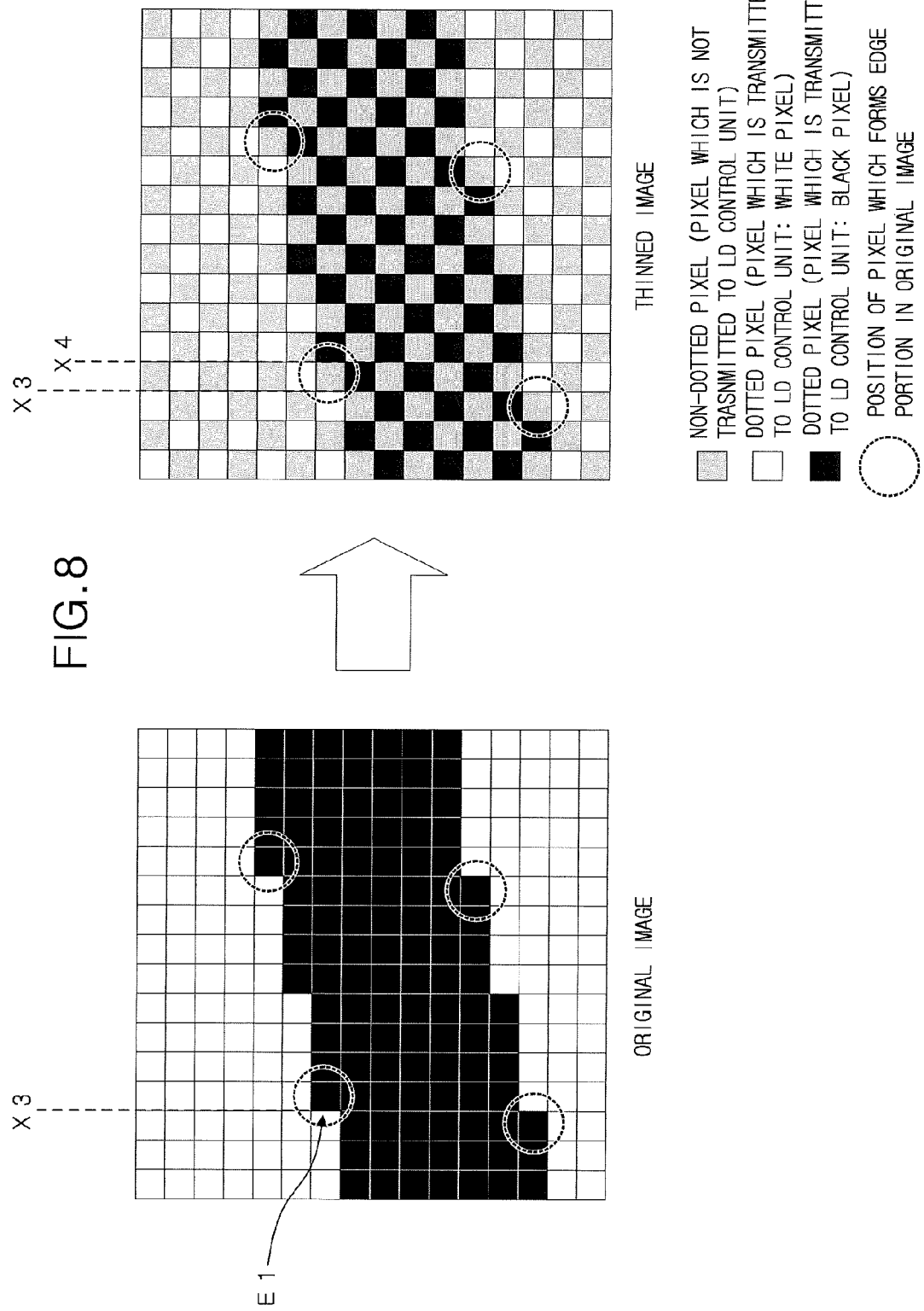

- NON-DOTTED PIXEL (PIXEL WHICH IS NOT TRASNMITTED TO LD CONTROL UNIT)
- DOTTED PIXEL (PIXEL WHICH IS TRANSMITTED TO LD CONTROL UNIT: WHITE PIXEL)
- DOTTED PIXEL (PIXEL WHICH IS TRANSMITTED TO LD CONTROL UNIT: BLACK PIXEL)
- PIXEL WHICH IS FORCEDLY DOTTED AS EDGE PORTION

- - - - Y 3

▨ NON-DOTTED PIXEL (PIXEL WHICH IS NOT TRASNMITTED TO LD CONTROL UNIT)

☐ DOTTED PIXEL (PIXEL WHICH IS TRANSMITTED TO LD CONTROL UNIT: WHITE PIXEL)

■ DOTTED PIXEL (PIXEL WHICH IS TRANSMITTED TO LD CONTROL UNIT: BLACK PIXEL)

▨ PIXEL WHICH IS FORCEDLY DOTTED AS EDGE PORTION

- NON-DOTTED PIXEL (PIXEL WHICH IS NOT TRASNMITTED TO LD CONTROL UNIT)
- DOTTED PIXEL (PIXEL WHICH IS TRANSMITTED TO LD CONTROL UNIT: WHITE PIXEL)
- DOTTED PIXEL (PIXEL WHICH IS TRANSMITTED TO LD CONTROL UNIT: BLACK PIXEL)
- PIXEL WHICH IS FORCEDLY DOTTED AS EDGE PORTION

IMAGE FORMING APPARATUS HAVING AN ASSIGNMENT UNIT THAT ASSIGNS PULSE MODULATION SIGNALS IN ACCORDANCE WITH A PREDETERMINED RULE AND A SPECIFIC PIXEL POSITION INFORMATION

BACKGROUND OF THE INVENTION

1. Field of the Invention

The present invention relates to an image forming apparatus for forming a two-dimensional image in which the pixels are arranged in the main scanning direction and the sub-scanning direction which is perpendicular to the main scanning direction. In particular, the present invention relates to an image forming apparatus which comprises a plurality of laser elements arranged in the sub-scanning direction and which can form an image simultaneously on a plurality of lines in the main scanning direction by simultaneously scanning the image in the main scanning direction with a plurality of laser lights emitted from a plurality of laser elements.

2. Description of Related Art

In an image forming apparatus using an electrophotographic process, in order to obtain a high resolution image and to realize the high speed processing, there is an image forming apparatus for forming an image simultaneously on a plurality of lines by simultaneously scanning an image by using a plurality of laser lights.

In such an image forming apparatus, for example, there is an image forming apparatus which changes the resolution in the sub-scanning direction of the image to be formed by selectively using a plurality of laser lights, and which can adjust the size in the sub-scanning direction of the image (See Japanese Patent Application Publication No. 2009-34991). The above image forming apparatus comprises a laser light source which comprises a plurality of laser elements and which can scan an image in parallel with a plurality of lines in the sub-scanning direction at the second resolution which is higher than the first resolution of the image formed in the main scanning direction. The magnification of the image in the sub-scanning direction is set according to the first resolution, the second resolution and the image size of the image to be formed, and some of a plurality of laser elements are selected and used according to the set magnification.

Further, in case that the integration degree of the surface emitting laser element (VCSEL) in the two-dimensional surface emitting laser array (two-dimensional VCSEL array) is increased, the thermal interference is caused between the adjacent laser elements (VCSEL). In order to suppress the thermal interference, after as the first main scanning in the direction perpendicular to the first base line, the VCSELs provided on the first base line and the second base line are emitted so as not to simultaneously emit the adjacent VCSELs on the first base line and so as not to simultaneously emit the adjacent VCSELs on the second base line, as the second main scanning in the direction perpendicular to the first base line, the VCSELs provided on the first base line and the second base line are emitted among the VCSELs which are not emitted in the first main scanning, so as not to simultaneously emit the adjacent VCSELs on the first base line and so as not to simultaneously emit the adjacent VCSELs on the second base line.

In an image forming apparatus using the laser elements, an LD control unit comprising laser elements and the drive circuit thereof is arranged near the laser scanning unit (or so as to be integrated with the laser scanning unit) in view of the scanning optional system for the laser light and the other mechanical request. On the other hand, an image processing unit for correcting the inclination of the image or executing the fine variable magnification for the image by processing the image data is provided apart from the LD control unit because the space is limited in the apparatus. The image processing unit transmits a signal for controlling the turning on/off of the laser elements (laser diode: LDs) provided in the LD control unit to the LD control unit in synchronization with the scanning for forming an image by using the laser lights. The above signal is a pulse width modulation signal corresponding to the value of the image data in each pixel. Therefore, the transmission path for the above signal must be high quality in order to transmit the signal at a low noise, and becomes expensive.

In case of the image forming apparatus for simultaneously forming an image on a plurality of lines by scanning the image using a plurality of laser lights emitted from a plurality of laser elements, as shown in FIG. 18, the PWM modulation circuits 121 are required for the number of the laser elements in the image processing unit 120. Further, in order to transmit the pulse width modulation signals generated by the image processing unit 120 to the LD control unit 110 at a low noise, the transmission paths having the high quality are required for the number of the laser elements. In case that the number of the laser elements is increased (for example, 32, 64 or more, or the like), the required number of the PWM modulation circuits and the required number of the transmission paths are increased. Therefore, the cost of the apparatus is increased and it is difficult to secure the space for arranging the transmission paths.

Each of Japanese Patent Application Publication No. 2009-34991 and Japanese Patent Application Publication No. 2007-109929 relates to the technology for selectively driving a plurality of emitting elements. However, the technology for reducing the number of the PWM modulation circuits or the number of the transmission paths for the pulse width modulation signals is not disclosed. Further, in each of the above technologies, in case that some of a plurality of emitting elements are selectively used, the deterioration of the resolution and/or the deterioration of the productivity are caused.

SUMMARY

To achieve at least one of the abovementioned objects, an image forming apparatus for forming a two-dimensional image in which pixels are arranged in a main scanning direction and a sub-scanning direction which is perpendicular to the main scanning direction, reflecting one aspect of the present invention, comprises:

n laser elements arranged in the sub-scanning direction and configured to simultaneously scan an image in the main scanning direction by using laser lights emitted from the n laser elements to simultaneously form the image having n lines in the main scanning direction, n being an integer which is 2 or more;

a pixel selection unit configured to execute a thinning process in which the pixels are thinned to m/n by selecting m pixels among n pixels arranged in the sub-scanning direction, m being an integer which is 1 or more, and the thinning process being executed for the image having the n lines by changing positions of the pixels to be selected according to positions in the main scanning direction;

a pulse width modulation processing unit configured to sequentially convert image data corresponding to the m pixels selected by the pixel selection unit into m pulse width modulation signals for the m pixels in synchronization with the scan of the image when the image having the n lines is formed;

a transmission unit configured to transmit the m pulse width modulation signals output by the pulse width modulation processing unit in parallel;

an assignment unit configured to assign the m pulse width modulation signals transmitted by the transmission unit in parallel to m of the laser elements corresponding to the positions of the m pixels which are conversion sources for obtaining the m pulse width modulation signals; and a driving unit configured to drive the laser elements to which the pulse width modulation signals are assigned by the assignment unit, in accordance with the assigned pulse width modulation signals.

Preferably, the pixel selection unit selects the m pixels so as to thin the image having the n lines at a same thinning ratio in the main scanning direction and in the sub-scanning direction.

Preferably, the pixel selection unit changes the position of the pixel to be selected according to image information of the image to be formed.

Preferably, the pixel selection unit necessarily includes a specific pixel which is arranged in an edge portion in both of the main scanning direction and the sub-scanning direction, in the pixels to be selected.

Preferably, in case that the specific pixel exists in the m pixels selected among the n pixels, the pixel selection unit does not include a pixel which adjacent to the specific pixel in the n pixels, in the pixels to be selected.

Preferably, the pixel selection unit determines the pixels to be selected in accordance with a predetermined rule, and the assignment unit assigns the pulse width modulation signals in accordance with the predetermined rule.

Preferably, the pixel selection unit determines the positions of the pixels to be selected in accordance with a predetermined rule, the image forming apparatus further comprises a notification unit configured to notify the assignment unit of specific pixel position information indicating a position of the specific pixel, in case that the specific pixel exists, and the assignment unit assigns the pulse width modulation signals in accordance with the predetermined rule and the specific pixel position information.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 3A and 3B are views showing an original image and an image obtained by thinning the original image in a checked pattern;

FIG. 4 is a view showing the situation in which the positions of the pixels to be selected are changed according to the pixel position in the main scanning direction;

FIG. 8 is a view showing the case in which the image of the substantially-horizontal slanting line which is substantially parallel to the main scanning direction and which has the width of eight pixels is drawn by thinning the image in the checked pattern;

DETAILED DESCRIPTION OF PREFERRED EMBODIMENTS

Hereinafter, preferred embodiments of the present invention will be explained with reference to the accompanying drawings.

First Embodiment

Figure 1:
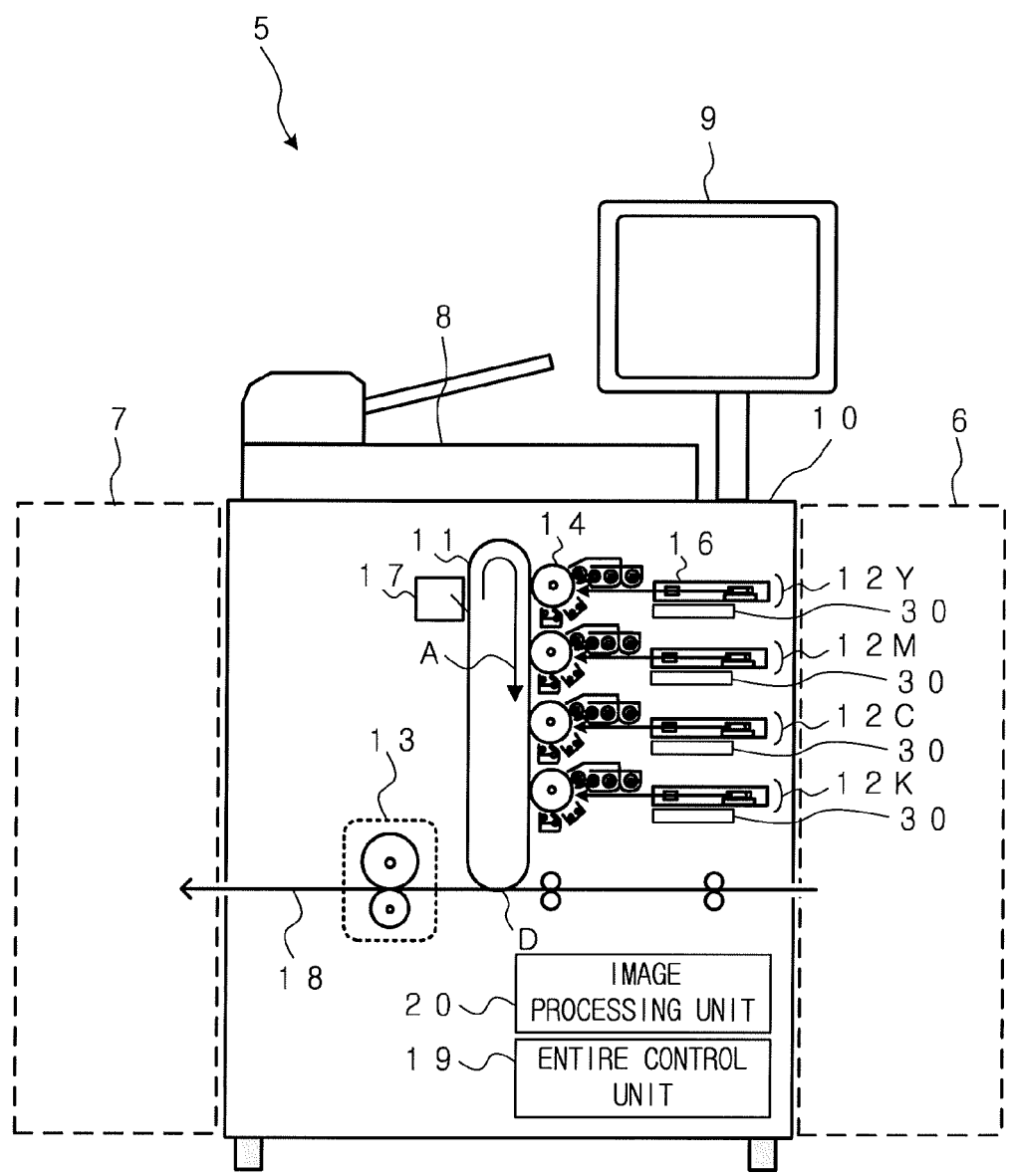
FIG. 1 is a view showing the mechanical schematic configuration of the image forming apparatus according to the first embodiment.

FIG. 1 is a view showing the mechanical schematic configuration of the image forming apparatus 5 according to the first embodiment. The image forming apparatus 5 has a copy function for printing out an image on a recording sheet by optically reading an original in a scanner unit 8, a printing function for printing out an image by forming the image on a recording sheet in accordance with the print data received from an external device, and the like. At the front stage of the image forming apparatus 5, a paper sheet feeding device 6 for containing a large number of recording sheets and for feeding the recording sheets one by one to the image forming apparatus 5 when the image or the like is printed, is connected. At the rear stage of the image forming apparatus 5, a post-processing device 7 having a function for carrying out the processing, such as folding, binding, punching and the like, for the recording sheet output from the image forming apparatus 5 and a function for containing a large number of recording sheets on which images are printed, is connected.

The image forming apparatus 5 forms a two-dimensional image in which the pixels are arranged in the main scanning direction and the sub-scanning direction which is perpendicular to the main scanning direction. The conveying direction of the recording sheet is referred to as the sub-scanning direction. The image forming apparatus 5 comprises an endless intermediate transfer belt 11 that is bridged annularly and that has a predetermined width, four toner image forming units 12Y, 12M, 12C and 12K which form single color toner images having the colors of yellow (Y), magenta (M), cyan (C) and black (K), respectively on the intermediate transfer belt 11, and a fixing device 13 for fixing the toner images on the recording sheet by pressing and heating the toner images formed on the recording sheet.

The toner image forming units 12Y, 12M, 12C and 12K use toners of different colors, but have the same structure. Each of the toner image forming units 12Y, 12M, 12C and 12K comprises a cylindrical photoconductive drum 14 that functions as an electrostatic latent image carrier on which an electrostatic latent image is formed, and comprises a charging device, a developing device, a transferring device, a cleaning device, and the like that are arranged around the photoconductive drum 14. Further, each of the toner image forming units 12Y, 12M, 12C and 12K has a laser unit 16 that includes laser diodes (LDs) which are the laser elements, a polygon mirror, various types of lenses and mirrors, and the like.

In each of the toner image forming units 12Y, 1214, 12C and 12K, the photoconductive drum 14 is driven by a driving unit not illustrated in the drawings to be rotated in a predetermined direction. The charging device uniformly charges the photoconductive drum 14. The laser unit 16 scans the photoconductive drum 14 (in the main scanning direction) with laser beams that are turned on and off in accordance with image data of the corresponding color (the pulse width modulation signal which will be explained) to form the electrostatic latent image on the surface of the photoconductive drum 14. In this embodiment, each laser unit 16 comprises n (n is an integer which is 2 or more) laser diodes (LDs) which are arranged in the sub-scanning direction. By simultaneously scanning an image in the main scanning direction by using the laser lights emitted from the n laser elements, the image can be formed simultaneously on n lines in the main scanning direction. In this embodiment, n laser diodes do not simultaneously emit laser lights, but the image of n lines is formed while the image is thinned.

The developing device visualizes the electrostatic latent image formed on the photoconductive drum 14 by using a toner. The toner image formed on the surface of the photoconductive drum 14 is transferred on the intermediate transfer belt 11 at the position where the photoconductive drum 14 contacts with the intermediate transfer belt 11. The cleaning device removes and collects the toner which remains on the surface of the photoconductive drum 14 by rubbing the remaining toner with a blade or the like after the transfer of the toner image.

The intermediate transfer belt 11 is wound so as to be bridged by a plurality of rollers, and is rotated in the direction of the arrow A in the drawing. In a process of the rotation of the intermediate transfer belt 11, the images (toner images) of the respective colors are formed on the intermediate transfer belt 11 so as to overlap the images in the order of the color Y, the color M, the color C and the color K by the image forming units 12Y, 12M, 12C and 12K. Thereby, the color image is composed. This color image is transferred from the intermediate transfer belt 11 to the recoding sheet at a second transferring position D. The toner which remains on the intermediate transfer belt 11 is removed by the cleaning device 17 provided on the downstream side of the second transferring position D. The fixing device 13 is provided on the position which is on the downstream side of the second transferring position D on a conveying passage 18 for conveying the recording sheet.

The conveying passage 18 has a function of conveying the recording sheet fed from the paper sheet feeding device 6 so as to pass the recording sheet through the second transferring position D and the fixing device 13, and discharging the recording sheet to the post-processing device 7 which is arranged on the rear stage. The conveying passage 18 is configured by conveying rollers and a guide unit that form a conveying path, and by a motor that drives the conveying rollers.

The image forming apparatus 5 comprises an entire control unit 19 for controlling the entire operation of the image forming apparatus 5 as an electric control circuit, an image processing unit 20 for carrying out the inclination correction, the fine variable magnification, the dither screen processing or the like for the image to be formed, and LD control units 30 for driving the laser diodes (LDs) of the laser units 16. Each LD control unit 30 is provided with each laser unit 16, and is arranged near the corresponding laser unit 16 (or is integrated with the laser unit 16). Therefore, each LD control unit 30 is provided apart from the entire control unit 19 and the image processing unit 20. The image processing unit 20 is connected with each LD control unit 30 via the transmission paths for transmitting the signal.

The image forming apparatus 5 has the two-side printing function for printing images on both sides of the recording sheet although the above two-side printing function is omitted from FIG. 1. Specifically, the conveying passage 18 comprises the reversing path which diverges from the normal conveying passage 18 on the downstream side of the fixing device 13 and which converges with the conveying passage 18 on the upstream side of the second transferring position D after the recording sheet is reversed. In case that the two-side printing is carried out, the image forming apparatus 5 forms and fixes the image on the front side of the recording sheet, and reverses the recording sheet through the reversing path. Then, the image forming apparatus 5 forms and fixes the image on the rear side of the recording sheet and discharges the recording sheet to the rear stage.

In addition, the image forming apparatus 5 further comprises a scanner unit 8 for reading an original set on an original tray by a user, an operation panel 9 for receiving the operation from a user and displaying various types of windows, and the like.

Figure 2:
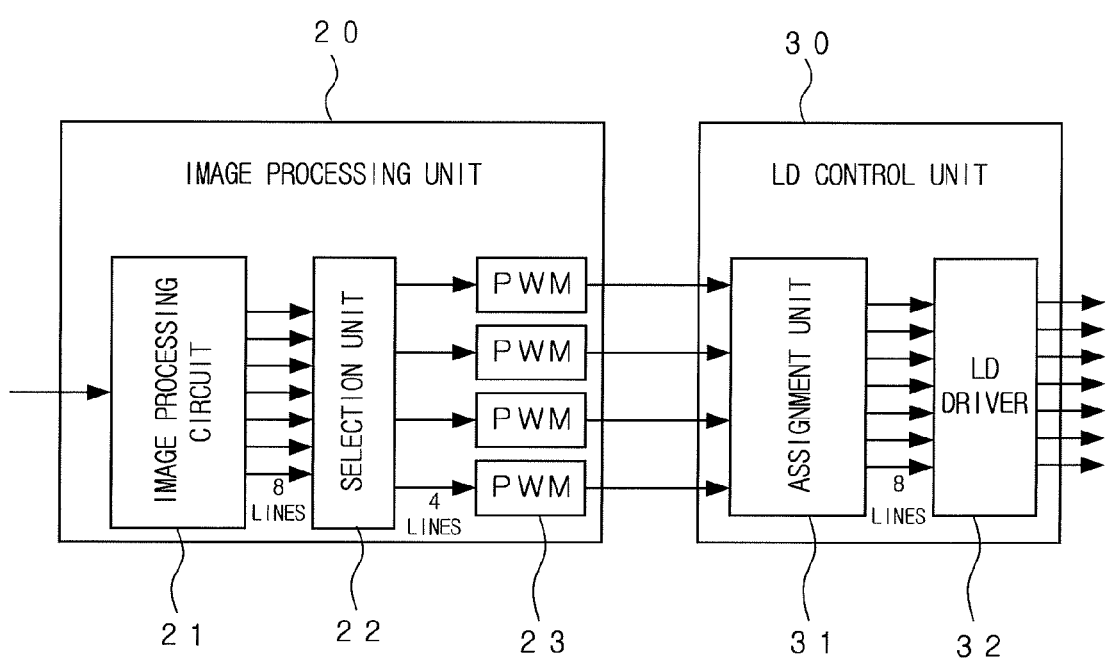
FIG. 2 is a block diagram showing each configuration of the image processing unit and the LD control unit.

FIG. 2 shows the configuration of the image processing unit 20 and the LD control unit 30. The image processing unit 20 comprises an image processing circuit 21 for processing the image data of the image to be formed and for carrying out the inclination correction, the fine variable magnification, the dither screen processing or the like for the image, a selection unit 22 (pixel selection unit) for selecting pixels from the image data output from the image processing circuit 21 to execute the thinning process, and PWM processing units 23 for converting the image data of each pixel selected by the selection unit 22 into a pulse width modulation signal.

The image processing circuit 21 outputs the image data of n lines to be simultaneously scanned by the laser unit 16 in parallel (the image data of n lines adjacent in the sub-scanning direction in parallel). At this time, the image data of each line is output sequentially from the head pixel to the end pixel of the line in synchronization with the scanning executed by the laser unit 16.

The selection unit 22 executes the process for thinning the image to m/n by selecting m (m is an integer which is 1 or more and n or less) pixels from n pixels of the image data input from the image processing circuit 21 in parallel while the positions of the pixels to be selected are changed according to the position in the main scanning direction. The selection unit 22 simultaneously outputs the thinned image data of m pixels in parallel to the PWM processing units 23 which are arranged on the rear stage of the selection unit 22. In FIG. 2, the value n is 8 and the value m is 4. Further, in this embodiment, in order to thin the image of n lines at the same thinning ratio in the sub-scanning direction and in the main scanning direction, the selection unit 22 changes the positions of the pixels according to the position in the main scanning direction when m pixels are selected from n pixels.

The PWM processing unit 23 converts the image data input from the selection unit 22 into the pulse width modulation signal. The image data represents the density of the pixel at the multistage. The PWM processing unit 23 outputs the pulse width modulation signal having the pulse width corresponding to the density represented by the input image data. In the image processing circuit 20, m PWM processing units 23 are provided so as to correspond to the image data of m pixels which are simultaneously output from the selection unit 22 in parallel. Each PWM processing unit 23 processes one corresponding pixel of the m selected pixels. The PWM processing unit 23 has an output driver for transmitting the pulse width modulation signal to the LD control unit 30 via the transmission path, and the like. The transmission unit for transmitting the pulse width modulation signal is configured by the output driver, the transmission path arranged between the PWM processing unit 23 and the assignment unit 31 of the LD control unit 30, and the like. The pixel transmitted by the pulse width modulation signal from the image processing unit 20 to the LD control unit 30 is referred to as the dotted pixel, and the pixel which is not transmitted is referred to as the non-dotted pixel.

In the example of FIG. 2, four pixels are selected as the dotted pixels from eight pixels arranged in the sub-scanning direction, which correspond to 8 lines to be scanned by the laser unit 16. The image data of the selected four pixels are converted into the pulse width modulation signals to transmit the signals from the image processing unit 20 to the LD control unit 30. The assignment unit 31 of the LD control unit 30 assigns four input pulse width modulation signals to the laser diodes corresponding to the positions (the positions of eight pixels arranged in the sub-scanning direction) of the pixels (the selected dotted pixels) which are the conversion sources for obtaining the pulse width modulation signals.

The LD driver 32 (driving unit) drives the laser diodes in accordance with the pulse width modulation signals assigned by the assignment unit 31. The LD driver 32 is provided for each laser diode. The LD driver 32 to which the pulse width modulation signal is assigned by the assignment unit 31 drives the corresponding laser diode in accordance with the above pulse width modulation signal. The LD driver 32 to which the pulse width modulation signal is not assigned turns off the corresponding laser diode.

In the first embodiment, the image is thinned in the sub-scanning direction every other one pixel and the image is thinned in the main scanning direction every other one pixel. That is, in FIGS. 3A and 3B, the pixels of the original image (FIG. 3A) are thinned in a checked pattern as shown in the thinned image (FIG. 3B). The pixels which remain in the thinned image are dotted pixels, and the thinned pixels are non-dotted pixels.

Each laser unit 16 scans eight lines simultaneously. However, because the dotted pixels are arranged in the checked pattern, as shown in FIG. 4, the positions of the pixels (the positions of four pixels to be selected from eight pixels arranged in the sub-scanning direction) are sequentially changed according to the positions of the pixels in the main scanning direction. Specifically, when the pixels are odd-numbered pixels from the head of the line in the main scanning direction, such as P3 (the third pixel from the head of the line), P11 (the eleventh pixel from the head of the line) and the like, the pixels corresponding to LD1, LD3, LD5 and LD7 in eight laser diodes (LD1 to LD8: LD array) arranged in the sub-scanning direction are selected as the dotted pixels.

Further, the pixels corresponding to LD2, LD4, LD6 and LD8 become non-dotted pixels. On the other hand, when the pixels are even-numbered pixels from the head of the line in the main scanning direction, such as P6 (the sixth pixel from the head of the line) and the like, the pixels corresponding to LD2, LD4, LD6 and LD8 are selected as the dotted pixels. Further, the pixels corresponding to LD1, LD3, LD5 and LD7 become non-dotted pixels.

In this case, the selection unit 22 selects the dotted pixels or the non-dotted pixels in accordance with the predetermined rule. The assignment unit 31 assigns the input pulse width modulation signals to the laser diodes in accordance with the above rule. In an example of FIG. 4, when the pixels are odd-numbered pixels from the head of the line in the main scanning direction, the selection unit 22 selects the pixels and the assignment unit 31 assigns the input pulse width modulation signals so as to select the pixels corresponding to LD1, LD3, LD5 and LD7 as the dotted pixels. On the other hand, when the pixels are even-numbered pixels from the head of the line in the main scanning direction, the selection unit 22 selects the pixels and the assignment unit 31 assigns the input pulse width modulation signals so as to select the pixels corresponding to LD2, LD4, LD6 and LD8 as the dotted pixels.

As described above, in accordance with the predetermined rule, the selection of the pixels and the assignment of the pulse width modulation signals are executed. Therefore, it is not necessary to transmit the information indicating the position of the dotted pixel from the image processing unit 20 to the LD control unit 30. It is possible to omit the transceiver circuit and the signal line for transmitting the above information.

Next, the reason why the image quality is maintained even though the pixels to be dotted by the laser diodes are thinned in the checked pattern, will be explained.

Figure 5:
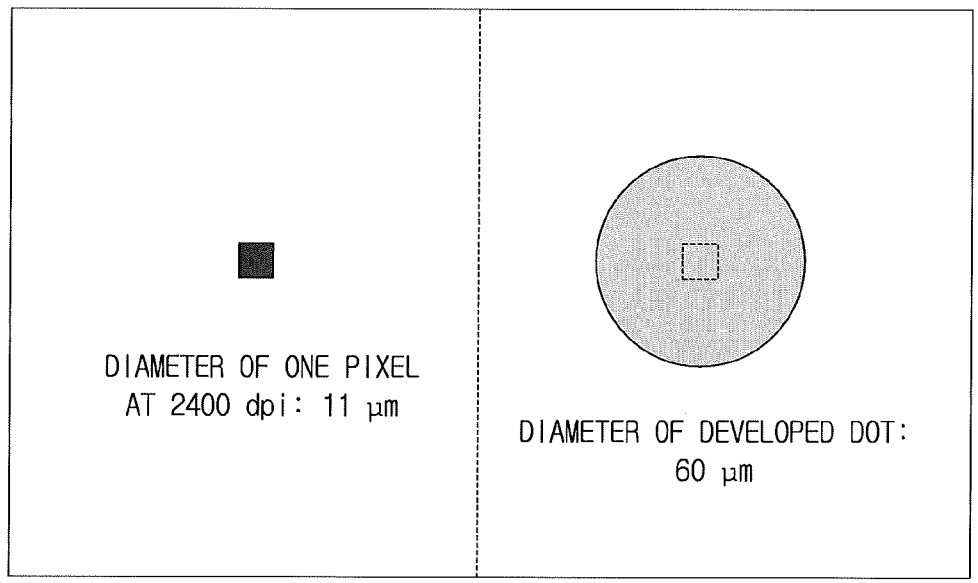
FIG. 5 is a view showing the diameter of one pixel on the electronic data at the resolution of 2400 dpi and the diameter of a dot which is actually printed.
Figure 6:
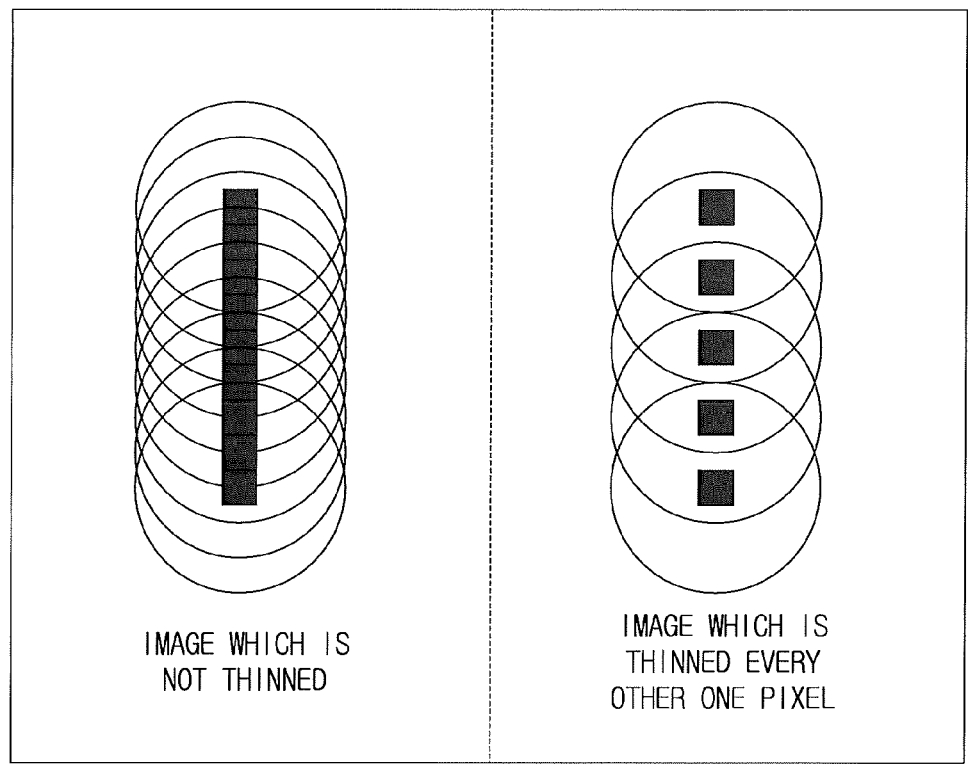
FIG. 6 is a view showing the image which is printed in case that the image is not thinned, and the image which is printed in case that the image is thinned.

In the electrophotographic process, in case that one pixel is isolately dotted by using the laser light, the diameter of the dot obtained by developing and printing one pixel on the recording sheet is considerably larger than the diameter of one pixel on the electronic data. For example, as shown in FIG. 5, in case of the resolution of 2400 dpi, the diameter of one pixel is 11 μm on the electronic data. On the other hand, the diameter of the dot which is actually developed is about 60 μm. As a result, the diameter of the dot which is actually developed is 5 times larger than the diameter of one pixel on the electronic data. Therefore, in case of a normal image, even though the image having the resolution of 2400 dpi is dotted by thinning the image every other one pixel as shown in FIG. 6, or by thinning the image at the interval of two pixels, the obtained image is hardly changed from the original image.

Figure 7A:
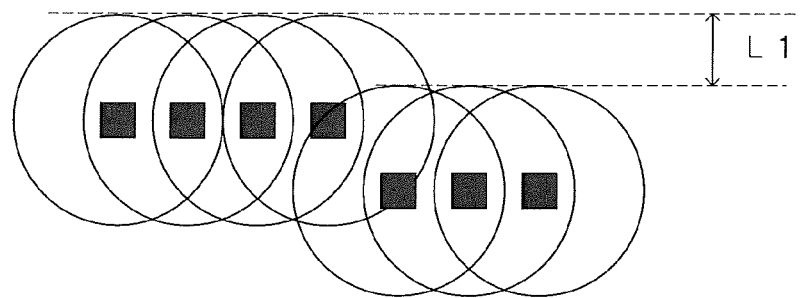
FIGS. 7A and 7B are views showing an example in which the difference in the resolution in the sub-scanning direction is shown in the printed image.
Figure 7B:
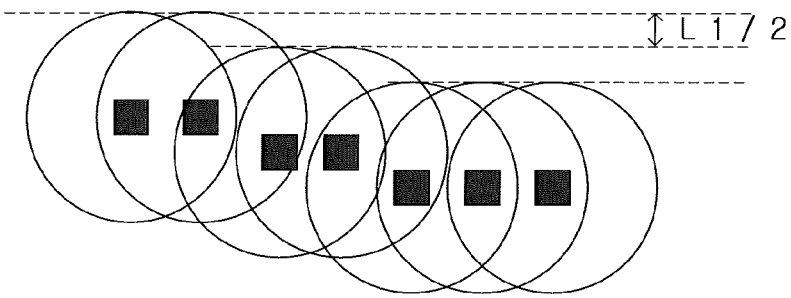

When the resolution of the image is high, the position of the pixel can be precisely controlled. FIGS. 7A and 7B show an example in which the position of the line in the main scanning direction is changed in the sub-scanning direction. The resolution of the image in the sub-scanning direction, which is shown in FIG. 7B is twice as much as that of the image shown in FIG. 7A. In case of FIG. 7A, the position of the line in the sub-scanning direction is changed only in units of the distance L1. On the other hand, in case of FIG. 7B, the position of the line can be changed in units of the distance L1/2.

Second Embodiment

Figure 10:
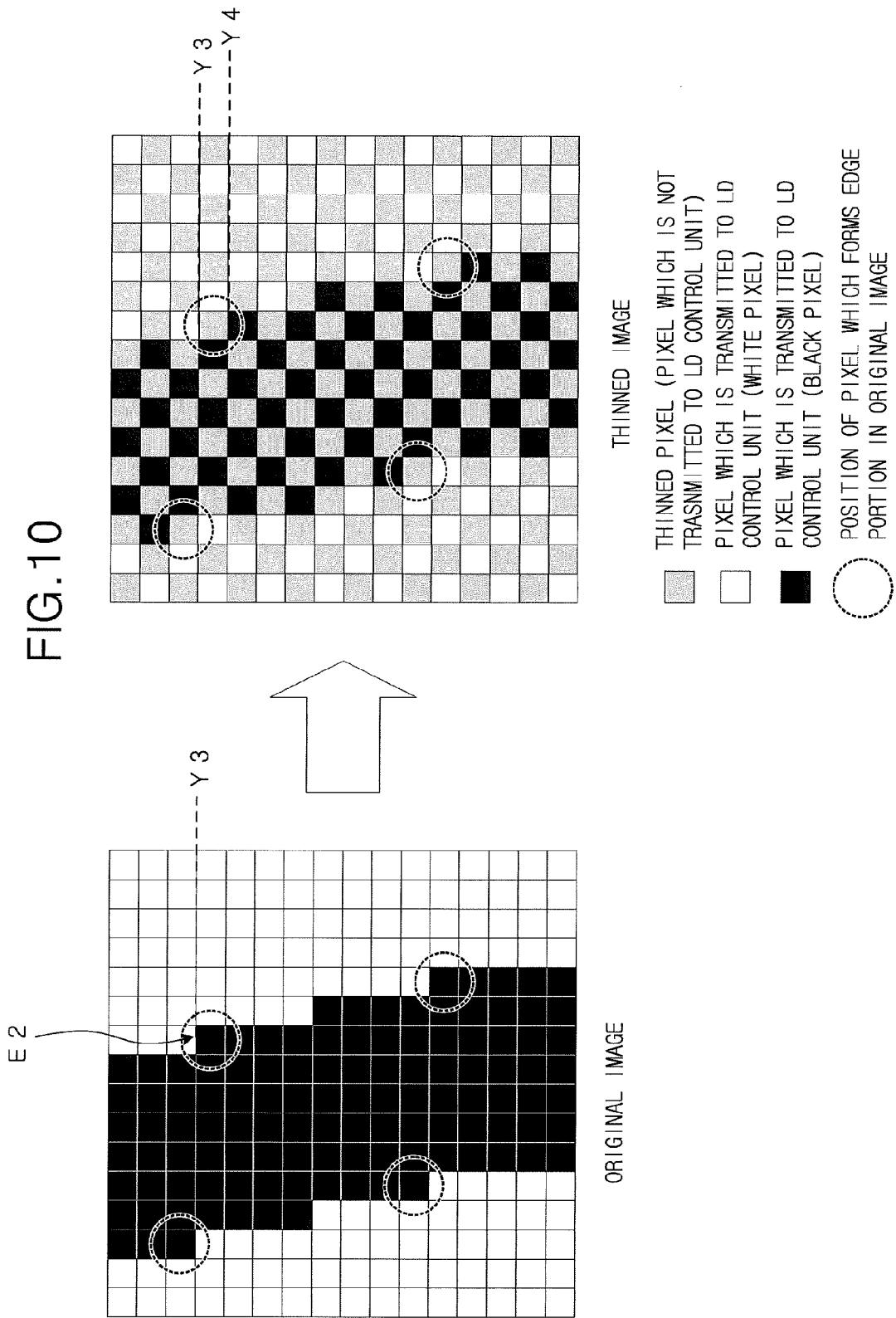
FIG. 10 is a view showing the case in which the image of the substantially-vertical slanting line which is substantially parallel to the sub-scanning direction and which has the width of eight pixels is drawn by thinning the image in the checked pattern.

In case that the image is regularly thinned at the specific period, such as the checked pattern or the like as explained in the first embodiment, when the thinned pixel (non-dotted pixel) is positioned at the edge portion of the image, the position of the pixel can be controlled at a high resolution in one of the sub-scanning direction and the main scanning direction, but the position of the pixel cannot be precisely reproduced at a high resolution in the other direction (See FIG. 8 and FIG. 10). Alternatively, the position of the pixel can be reproduced in neither the sub-scanning direction nor the main scanning direction (See FIG. 12).

FIG. 8 shows the case in which the image of the substantially-horizontal slanting line which is substantially parallel to the main scanning direction and which has the width of eight pixels is drawn by thinning the image in the checked pattern. In the drawing, the left image is the original image, and the right image is the thinned image. In this example, the image can be expressed at the resolution of 2400 dpi in the sub-scanning direction. However, in case of the main scanning direction, because the dot cannot be printed at the position in which the pixel which exists at the edge portion in the original image (in the drawing, the pixel which is enclosed by the broken circle) is the pixel to be thinned (non-dotted pixel), the image can be substantially expressed only at the resolution of 1200 dpi. For example, the edge portion E1 which is positioned at X3 in the main scanning direction in the original image is moved to X4 which is shifted right by one pixel in the thinned image.

Figure 9:
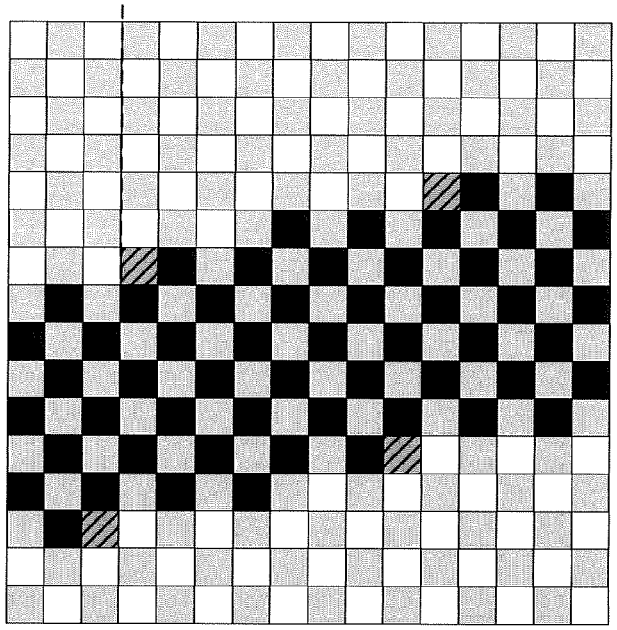
FIG. 9 is a view showing the image in case that the pixels enclosed in the broken circles shown in FIG. 8 are forcedly selected as the dotted pixels.

Therefore, in case that the angular direction of the edge is closer to the main scanning direction (horizontal line) (when the inclined angle with respect to the main scanning direction is $\alpha$, the inequality $-45$ degrees$<\alpha<+45$ degrees is satisfied and $\alpha$ is not equal to 0), the selection unit 22 executes the control for selecting the pixel (referred to as the forced dot control) so as to necessarily dot the pixel which forms the edge portion in the main scanning direction (forcedly select the pixel as the dotted pixel). For example, in case that the pixel which forms the edge portion in the main scanning direction is the pixel to be thinned in accordance with the rule for thinning the image in the checked pattern, the selection unit 22 forcedly selects the above pixel as the dotted pixel regardless of the above rule. Thereby, the edge portion can be precisely reproduced. FIG. 9 shows the situation in which the pixels enclosed in the broken circles shown in FIG. 8 are forcedly selected as the dotted pixels. For example, by forcedly selecting the pixel of the edge portion E1 shown in FIG. 8 as the dotted pixel, the edge portion in the main scanning direction is reproduced at the position of X3. Therefore, at the position of the edge in the main scanning direction, the edge portion is reproduced at the resolution of 2400 dpi.

Similarly, incase that the angular direction of the edge is closer to the sub-scanning direction (vertical line) (when the inclined angle with respect to the sub-scanning direction is $\beta$, the inequality $-45$ degrees$<\beta<+45$ degrees is satisfied and $\beta$ is not equal to 0) and in case that the pixel of the edge portion in the sub-scanning direction is a pixel to be thinned (non-dotted pixel), the selection unit 22 executes the forced dot control in which the above pixel is necessarily dotted (the above pixel is forcedly selected as the dotted pixel).

For example, FIG. 10 shows the case in which the image of the substantially-vertical slanting line which is substantially parallel to the sub-scanning direction and which has the width of eight pixels is drawn by thinning the image in the checked pattern. In the drawing, the left image is the original image, and the right image is the thinned image. In this example, the image can be expressed at the resolution of 2400 dpi in the main scanning direction. However, in case of the sub-scanning direction, because the dot cannot be printed at the position in which the pixel which exists at the edge portion in the original image (in the drawing, the pixel which is enclosed by the broken circle) is the pixel to be thinned (non-dotted pixel), the image can be substantially expressed only at the resolution of 1200 dpi. For example, the edge portion E2 which is positioned at Y3 in the sub-scanning direction in the original image is moved to Y4 which is shifted downwardly by one pixel in the thinned image.

Figure 11:
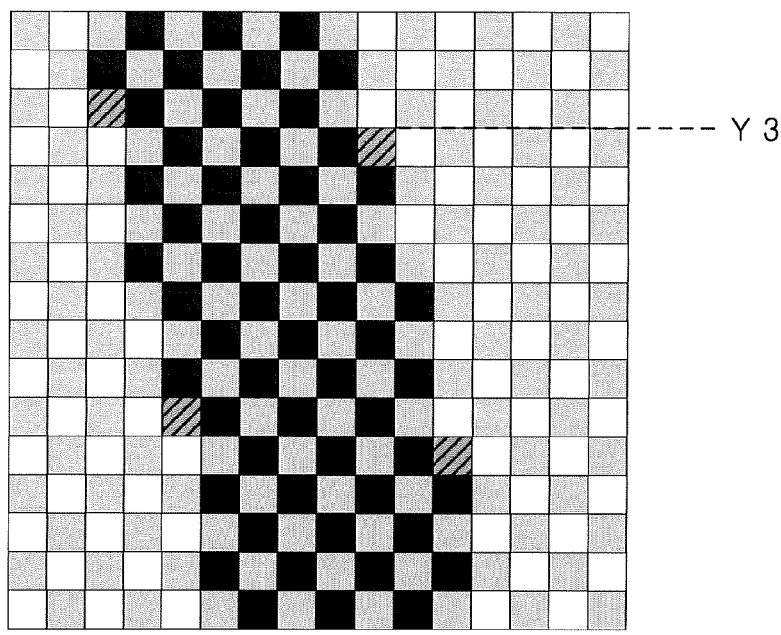
FIG. 11 is a view showing the image in case that the pixels enclosed in the broken circles shown in FIG. 10 are forcedly selected as the dotted pixels.

Therefore, in case that the angular direction of the edge is closer to the sub-scanning direction (vertical line) (when the inclined angle with respect to the sub-scanning direction is $\beta$, the inequality $-45$ degrees$<R<+45$ degrees is satisfied and $\beta$ is not equal to 0), the selection unit 22 executes the forced dot control so as to necessarily dot the pixel which forms the edge portion in the sub-scanning direction (forcedly select the pixel as the dotted pixel). For example, in case that the pixel which forms the edge portion in the sub-scanning direction is the pixel to be thinned in accordance with the rule for thinning the image in the checked pattern, the selection unit 22 forcedly selects the above pixel as the dotted pixel regardless of the above rule. Thereby, the edge portion can be precisely reproduced. FIG. 11 shows the situation in which the pixels enclosed in the broken circles shown in FIG. 10 are forcedly selected as the dotted pixels. For example, by forcedly selecting the pixel of the edge portion E2 shown in FIG. 10 as the dotted pixel, the edge portion in the sub-scanning direction is reproduced at the position of Y3. Therefore, at the position of the edge in the sub-scanning direction, the edge portion is reproduced at the resolution of 2400 dpi.

Figure 12:
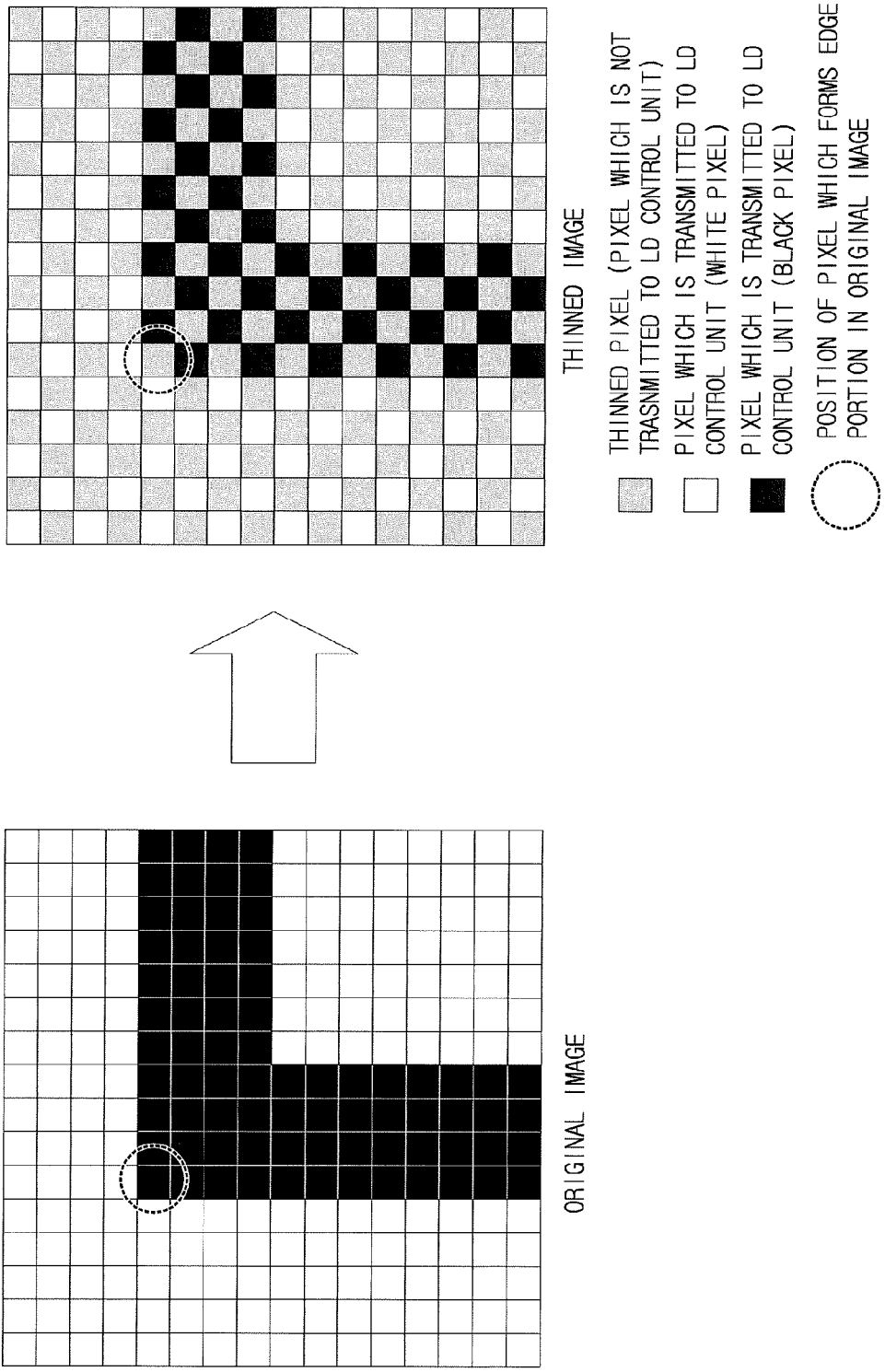
FIG. 12 is a view showing the case in which the pixel which is arranged in the edge portion in both of the main scanning direction and the sub-scanning direction is the non-dotted pixel.

An example in which the image quality is considerably influenced by the non-dotted pixel will be explained. As shown in FIG. 12, in case that the pixel (in the drawing, the pixel which is enclosed by the broken circle) which is arranged in the edge portion in both of the main scanning direction and the sub-scanning direction is the non-dotted pixel, the outline of the edge portion which is originally expressed at the right angle is roundly drawn.

Figure 13:
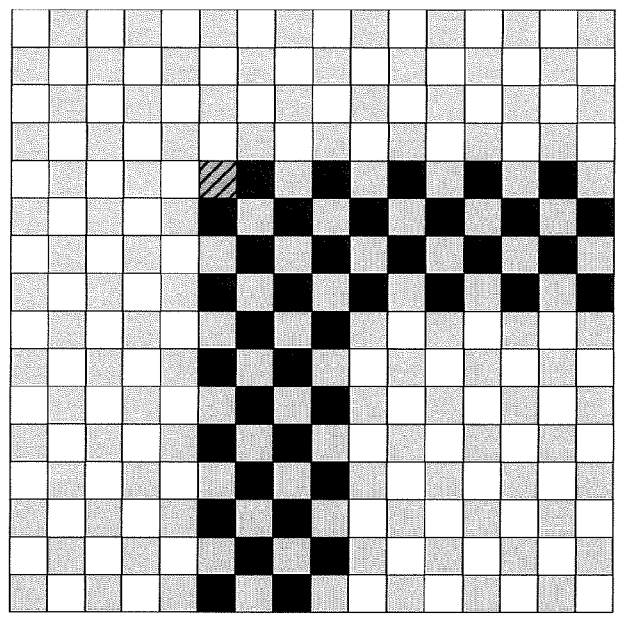
FIG. 13 is a view showing the image in which the pixel which is arranged in the edge portion in both of the main scanning direction and the sub-scanning direction is forcedly selected as the dotted pixel.

Therefore, as shown in FIG. 13, the selection unit 22 executes the forced dot control in which the pixel arranged in the edge portion in both of the main scanning direction and the sub-scanning direction is selected as the dotted pixel. Thereby, the reproducibility of the right angle is improved.

The pixels enclosed in the broken circles shown in FIGS. 8 and 10 are pixels which are arranged in the edge portion in both of the main scanning direction and the sub-scanning direction. Therefore, the selection unit 22 may execute the forced dot control in which the pixels arranged in the edge portion in both of the main scanning direction and the sub-scanning direction are necessarily selected as the dotted pixels and are forcedly dotted.

As described above, in case that the selection unit 22 executes the forced dot control in which the pixels arranged in the edge portion in both of the main scanning direction and the sub-scanning direction are forcedly selected as the dotted pixels and are always dotted, the reproducibility of the edge portion is improved. However, for example, in case that only the forced dot control is added to the rule for thinning the image in the checked pattern, the number of the dotted pixels is increased. That is, because there is some possibility that the number of the laser diodes which simultaneously emit the lights is increased by 1, it is necessary to increase the number of the PWM processing units 23 and the number of the transmission paths for transmitting the pulse width modulation signals from the PWM processing units 23 to the LD control unit 30.

Therefore, when the forced dot control is executed, in order not to increase the number of the dotted pixels, by forcedly setting the pixel except the pixels arranged in the edge portion to the non-dotted pixel instead of the pixel which is forcedly set to the dotted pixel, the number of the laser diodes which simultaneously emit the lights is not increased.

Figure 14:
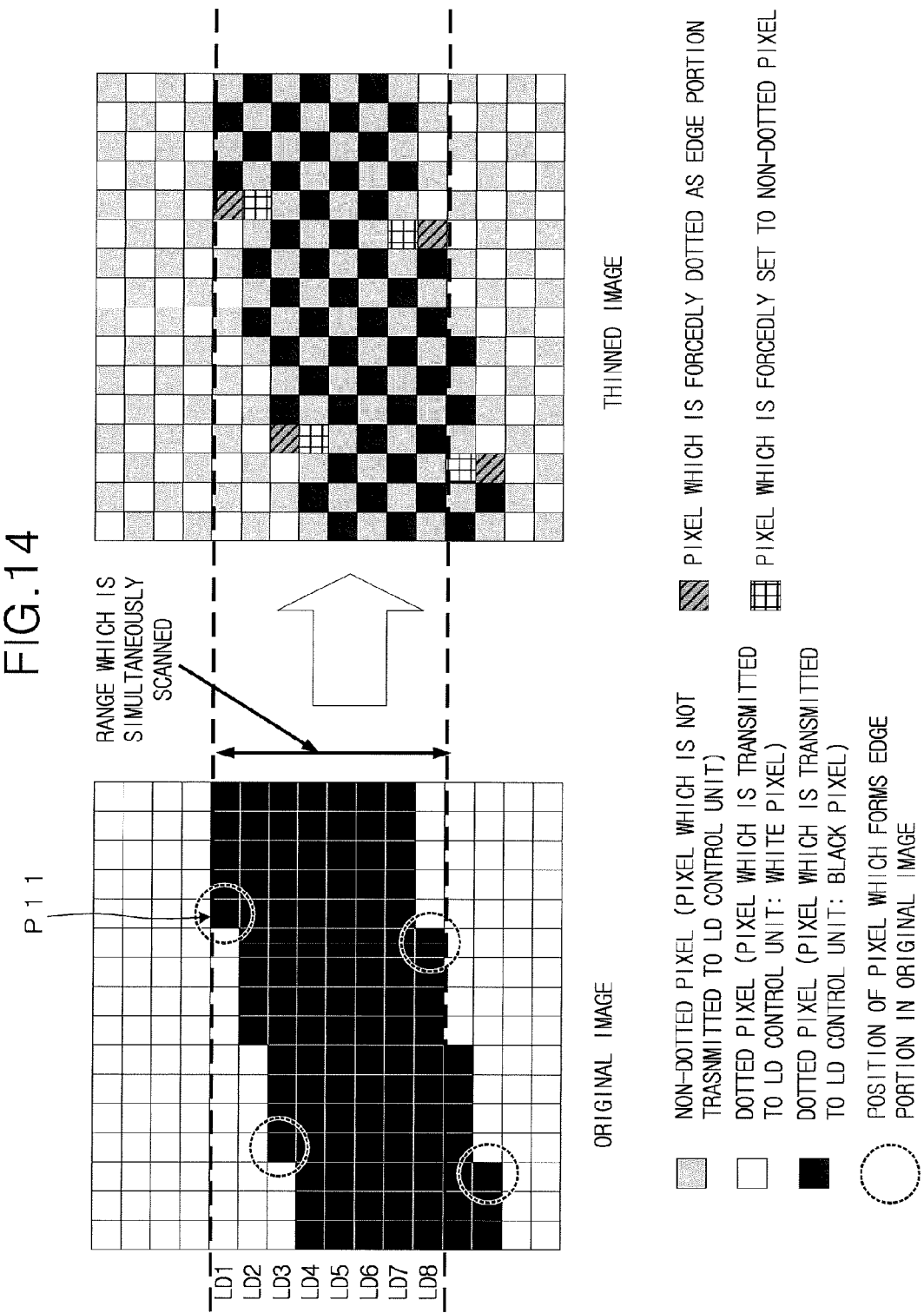
FIG. 14 is a view showing an example in which the pixel adjacent to the pixel which is forcedly selected as the dotted pixel is forcedly selected as the non-dotted pixel.

FIG. 14 shows an example in which the pixel adjacent to the pixel which is forcedly dotted (the adjacent pixel selected among n pixels arranged in the sub-scanning direction) is forcedly selected as the non-dotted pixel. In case that the image is thinned in the checked pattern, the pixel adjacent to the pixel which is forcedly dotted may be forcedly set to the non-dotted pixel. However, for example, in case that three pixels are selected as the dotted pixels among nine pixels as described in the third embodiment which will be explained, the pixel which is the closest to the pixel which is forcedly dotted, among the pixels to be selected in accordance with the normal rule may be forcedly set to the non-dotted pixel.

Figure 15:
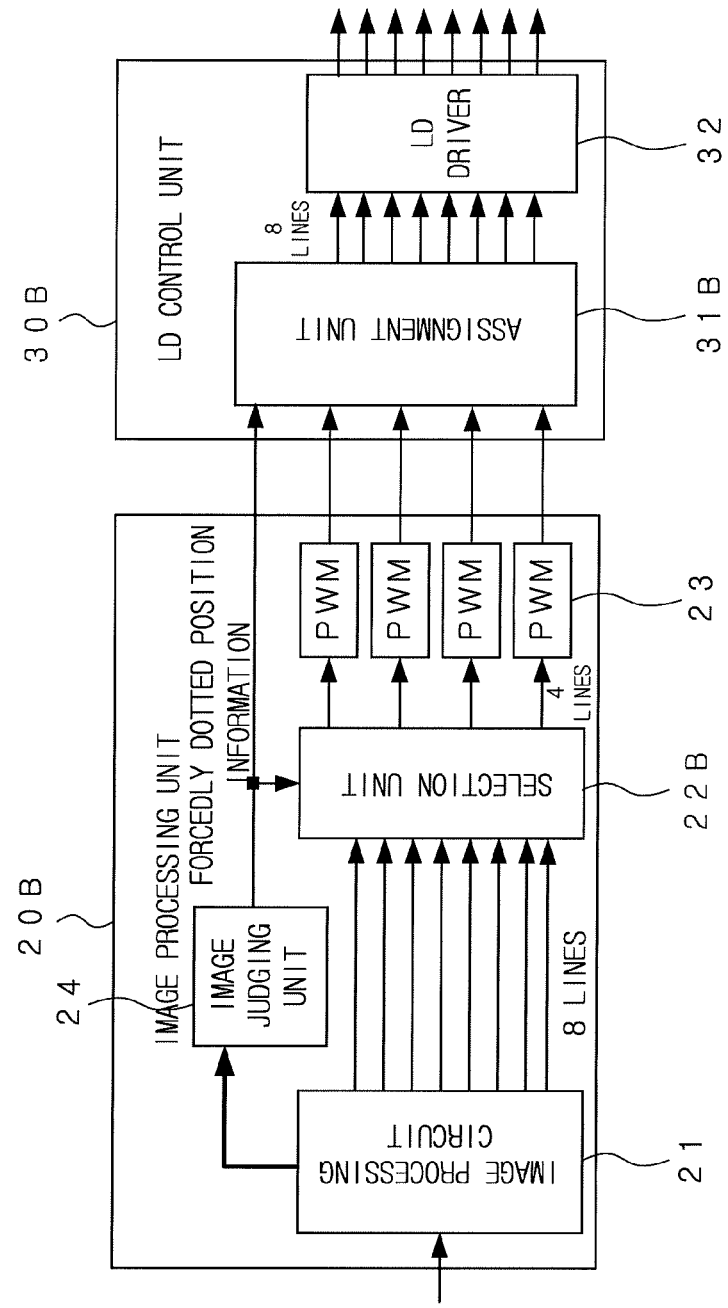
FIG. 15 is a block diagram showing the image processing unit and the LD control unit according to the second embodiment.

FIG. 15 shows the circuit configuration corresponding to the forced dot control. In FIG. 15, the elements which are the same as those of FIG. 2 are denoted by the reference numerals which are the same as those of FIG. 2. The explanation thereof is appropriately omitted. The image processing unit 20B comprises an image judging unit 24 (notification unit). The image judging unit 24 specifies the position of the pixel which is forcedly set to the dotted pixel, by recognizing the edge portion in the image. Further, the image judging unit 24 notifies the selection unit 22B (pixel selection unit) and the assignment unit 31B provided in the LD control unit 30B of the forcedly dotted position information indicating the specified position.

For example, in case that the pixel to be set to the pixel which is forcedly dotted (the pixel arranged in the edge portion in both of the main scanning direction and the sub-scanning direction) exists in eight pixels to be output simultaneously from the image processing unit 20B, the image judging unit 24 outputs the forcedly dotted position information indicating the position of the above pixel. The forcedly dotted position information includes the information for specifying the pixel which is forcedly set to the dotted pixel in eight pixels, and the information for specifying the pixel which is forcedly set to the non-dotted pixel. The latter information may be expressed by the position relative to the position of the pixel which is forcedly dotted.

For example, the information may indicate whether the pixel which is forcedly set to the non-dotted pixel is arranged immediately above the pixel which is forcedly dotted (the pixel which is adjacent on the minus side in the sub-scanning direction) or immediately below the pixel which is forcedly dotted (the pixel which is adjacent on the plus side in the sub-scanning direction).

The selection unit 22B selects the final dotted pixel in accordance with the predetermined rule for determining the position of the dotted pixel (for example, the rule for thinning the image in the checked pattern) and the forcedly dotted position information, and outputs the image data of the selected dotted pixels to the PWM processing units 23. The assignment unit 31B of the LD control unit 30B recognizes the position of the dotted pixel in accordance with the above rule which is the same as the rule used in the selection unit 22B and the forcedly dotted position information, and assigns each pulse width modulation signal to the corresponding laser diode.

For example, in FIG. 14, when eight pixels which are positioned on the position P11 in the main scanning direction and which are arranged in the sub-scanning direction are processed in the eight lines which are currently scanned, the forcedly dotted position information indicating that the first pixel (LD1) of the eight pixels is the pixel which is forcedly dotted and that the pixel (LD2) which is arranged immediately below the first pixel is the pixel which is forcedly set to the non-dotted pixel, is output from the image judging unit 24. In case of the original rule, at P11 (the position in the main scanning direction is the odd-numbered position), the pixels corresponding to LD2, LD4, LD6 and LD8 are the dotted pixels. However, by correcting the pixels in accordance with the forcedly dotted position information, the pixels corresponding to LD1, LD4, LD6 and LD8 become the dotted pixels.

In this example, for example, the rule for selecting the dotted pixels includes that the pixels are selected in the checked pattern, the pixel in the edge portion in both of the main scanning direction and the sub-scanning direction is selected as a specific pixel, and when the specific pixel is selected, the pixel adjacent to the specific pixel is set to the non-dotted pixel. Because the assignment unit 31B cannot recognize the edge portion by directly judging the image, the image judging unit 24 notifies the assignment unit 31B of the position of the specific pixel by using the specific pixel position information. The assignment unit 31B recognizes the final dotted pixel and assigns the PWM width modulation signals by correcting the dotted pixels determined by the above rule in accordance with the specific pixel position information.

The transmission path for transmitting the forcedly dotted position information from the image processing unit 20B to the LD control unit 30B is required. However, because the forcedly dotted position information can be transmitted as the digital information unlike the pulse width modulation signal, the above information can be serialized. As a result, the influence caused by increasing the number of the transmission path is small.

Third Embodiment

Figure 16:
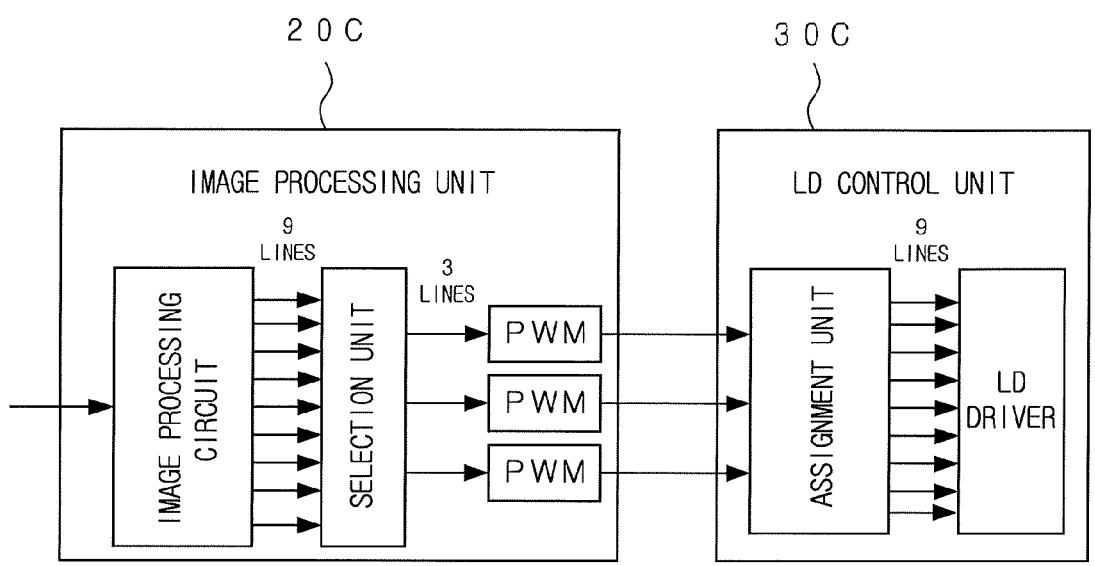
FIG. 16 is a block diagram showing the image processing unit and the LD control unit according to the third embodiment.
Figure 17:
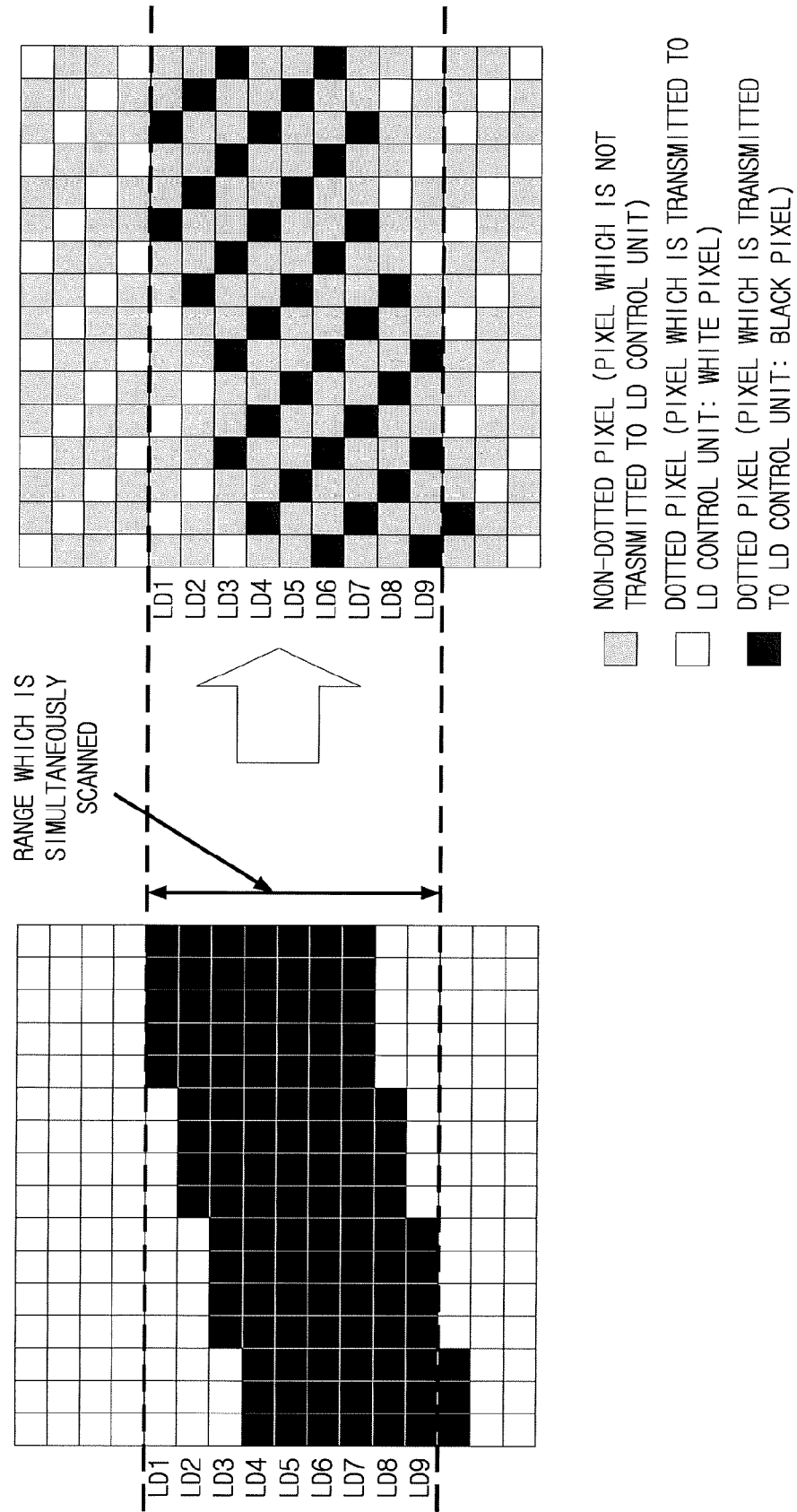
FIG. 17 is a view showing the original image and the image obtained by thinning the original image to ⅓.
Figure 18:
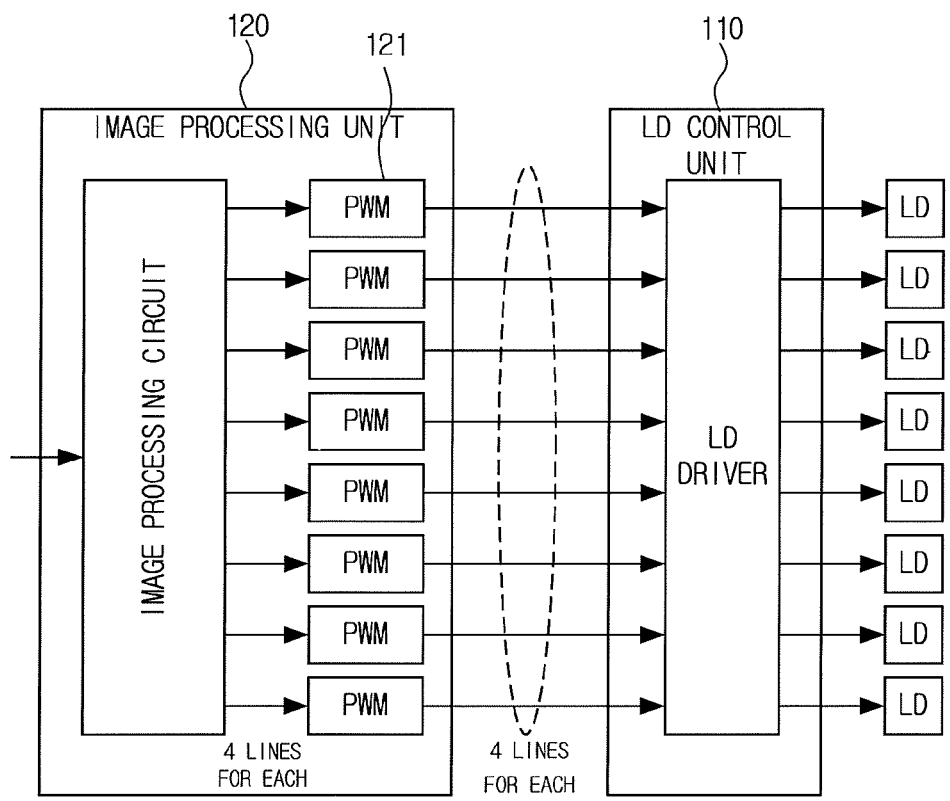
FIG. 18 is a block diagram showing the image processing unit and the LD control unit in a conventional image forming apparatus.

In the first and the second embodiments, eight pixels are thinned to four pixels. The number n of the laser diodes and the number m of the pixels to be selected by the selection unit 22 or 22B may be optionally set in case that the inequality n>m is satisfied and each of n and m is an integer which is 1 or more. For example, the configuration of the image processing unit 20C and the LD control unit 30C which are used in case that n is set to 9, m is set to 3 and the image data is thinned to ⅓, and an example of the processing thereof are shown in FIG. 16 and FIG. 17.

In this case, only the image data of three pixels are transmitted for nine laser diodes to the assignment unit of the LD control unit 30C by the pulse width modulation signals. Thereby, the required number of the PWM processing units 23 and the required number of the transmission paths for transmitting the pulse width modulation signals are 3 which is calculated by dividing the number of the laser diodes by 3.

However, because the image data is thinned to ⅓, the density of the dotted pixels is reduced to ⅓ as compared with that of the original image. Therefore, when the diameter of the developed dot is small, there is some possibility that the unevenness of the image is caused and the image quality is deteriorated. However, in case that the difference between the diameter of the dot which is actually developed and the dot diameter determined on the basis of the resolution is sufficiently large, the deterioration of the image quality is small even though the image data is thinned to ⅓. For example, in case that the image having the high resolution is printed, for example, the image having the resolution of 2400 dpi is printed by using the image data having the resolution of 3600 dpi, the above thinning is effective.

In the image forming apparatus 5 according to each embodiment, it is possible to reduce the number of the PWM processing units 23 and the number of the transmission paths for transmitting the pulse width modulation signals. Because the emitting time of each laser diode is shortened by the thinning of the image data, it is possible to lengthen the lifetime of the laser diode.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the embodiments, in case that m pixels are selected among the range (n pixels in the sub-scanning direction) in which each laser unit 16 is simultaneously scanned, it is desirable that m pixels are selected among n pixels so as to evenly disperse m pixels, such as in the checked pattern or the like. Similarly, also in the main scanning direction, it is desirable that the dotted pixels are selected so as to evenly disperse the dotted pixels.

In the embodiments, the process for selecting the dotted pixels by the selection unit 22 is executed in synchronization with the scanning executed in the laser unit 16. However, the selection of the pixels may be previously executed for the entire image and the result of the above selection may be stored. Then, in accordance with the stored result, each PWM processing unit 23 may generate the pulse width modulation signal and transmit the pulse width modulation signal to the LD control unit 30 in synchronization with the scanning executed in the laser unit 16.

In the embodiments, as an example in which the positions of the pixels to be selected as the dotted pixel are changed according to the image information of the image to be formed, the case in which the pixel which is forcedly dotted and the pixel which is forcedly set to the non-dotted pixel are set by judging the edge portion, is explained. However, according to another factor except the edge portion, the position of the dotted pixel may be determined. For example, in case that there are m or less black pixels (except white pixels) in n pixels which are arranged in the sub-scanning direction and scanned by the laser unit 16 once, all of the black pixels may be selected as the dotted pixels. On the other hand, in case that there are m or more black pixels (except white pixels), m pixels may be selected among the black pixels. Further, the position of the dotted pixel may be selected according to the screen pattern of the image.

One of the objects of the above embodiments is to provide an image forming apparatus which can reduce the number of the generation circuits for generating the pulse width modulation signals for controlling the driving of the laser elements and the number of the transmission paths without deteriorating the resolution and the productivity of the image, which can be obtained by simultaneously scanning the image by using a plurality of laser lights.

In at least one of the embodiments, m pixels are selected among n pixels arranged in the sub-scanning direction (the image is thinned to m/n), and the image is formed by driving only the laser elements arranged on the positions corresponding to the above m pixels among n laser elements. At this time, by changing the positions of m pixels to be selected according to the position in the main scanning direction, the image is thinned also in the main scanning direction. Therefore, the image obtained by thinning the pixels to be dotted by the laser elements in both of the main scanning direction and the sub-scanning direction is formed.

In at least one of the embodiments, for example, the position of the pixel to be selected is changed according to whether the portion to be formed is the edge portion, or according to the screen pattern formed on the image.

In at least one of the embodiments, in case that pixel arranged in the edge portion in both of the main scanning direction and the sub-scanning direction is not dotted, the edge portion becomes round. Therefore, the above pixel is necessarily selected.

In at least one of the embodiments, in case that the specific pixel which is arranged in the edge portion in both of the main scanning direction and the sub-scanning direction is selected, the pixel adjacent to the specific pixel is not selected.

In at least one of the embodiments, because the selection of the pixels and the assignment of the pulse width modulation signals are executed in the predetermined rule, it is not necessary that the selection unit notifies the assignment unit of the information indicating the selected pixels. Therefore, it is possible to omit the transceiver circuit and the signal line for transmitting the above information.

In at least one of the embodiments, the selection unit selects the pixels in accordance with the predetermined rule, and notifies the assignment unit of the specific pixel position information indicating the position of the specific pixel. The assignment unit assigns the pulse width modulation signals to the laser elements in accordance with the predetermined rule and the specific pixel position information.

According to the image forming apparatus, it is possible to reduce the number of the generation circuits for generating the pulse width modulation signals for controlling the driving of the laser elements and the number of the transmission paths without deteriorating the resolution and the productivity of the image, which can be obtained by simultaneously scanning a plurality of lines by using a plurality of laser lights.

The present U.S. patent application claims the priority of Japanese Patent Application No. 2014-258260, filed on Dec. 22, 2014, according to the Paris Convention, and the entirety of which is incorporated herein by reference for correction of incorrect translation.

What is claimed is:

1. An image forming apparatus for forming a two-dimensional image in which pixels are arranged in a main scanning direction and a sub-scanning direction which is perpendicular to the main scanning direction, comprising:
   n laser elements arranged in the sub-scanning direction and configured to simultaneously scan an image in the main scanning direction by using laser lights emitted from the n laser elements to simultaneously form the image having n lines in the main scanning direction, n being an integer which is 2 or more;
   a pixel selection unit configured to execute a thinning process in which the pixels are thinned to m/n by selecting m pixels among n pixels arranged in the sub-scanning direction, m being an integer which is 1 or more, and the thinning process being executed for the image having the n lines by changing positions of the pixels to be selected according to positions in the main scanning direction;
   a pulse width modulation processing unit configured to sequentially convert image data corresponding to the m pixels selected by the pixel selection unit into m pulse width modulation signals for the m pixels in synchronization with the scan of the image when the image having the n lines is formed;
   a transmission unit configured to transmit the m pulse width modulation signals output by the pulse width modulation processing unit in parallel;
   an assignment unit configured to assign the m pulse width modulation signals transmitted by the transmission unit in parallel to m of the laser elements corresponding to the positions of the m pixels which are conversion sources for obtaining the m pulse width modulation signals; and
   a driving unit configured to drive the laser elements to which the pulse width modulation signals are assigned by the assignment unit, in accordance with the assigned pulse width modulation signals.

2. The image forming apparatus of claim 1, wherein the pixel selection unit selects the m pixels so as to thin the image having the n lines at a same thinning ratio in the main scanning direction and in the sub-scanning direction.

3. The image forming apparatus of claim 1, wherein the pixel selection unit changes the position of the pixel to be selected according to image information of the image to be formed.

4. The image forming apparatus of claim 1, wherein the pixel selection unit necessarily includes a specific pixel which is arranged in an edge portion in both of the main scanning direction and the sub-scanning direction, in the pixels to be selected.

5. The image forming apparatus of claim 4, wherein in case that the specific pixel exists in the m pixels selected among the n pixels, the pixel selection unit does not include a pixel which adjacent to the specific pixel in the n pixels, in the pixels to be selected.

6. The image forming apparatus of claim 1, wherein the pixel selection unit determines the pixels to be selected in accordance with a predetermined rule, and
   the assignment unit assigns the pulse width modulation signals in accordance with the predetermined rule.

7. The image forming apparatus of claim 4, wherein the pixel selection unit determines the positions of the pixels to be selected in accordance with a predetermined rule,
   the image forming apparatus further comprises a notification unit configured to notify the assignment unit of specific pixel position information indicating a position of the specific pixel, in case that the specific pixel exists, and
   the assignment unit assigns the pulse width modulation signals in accordance with the predetermined rule and the specific pixel position information.

* * * * *